April 30, 1957 H. C. FLINT 2,790,488
SPRING CONSTRUCTION
Filed Nov. 21, 1950 3 Sheets-Sheet 1
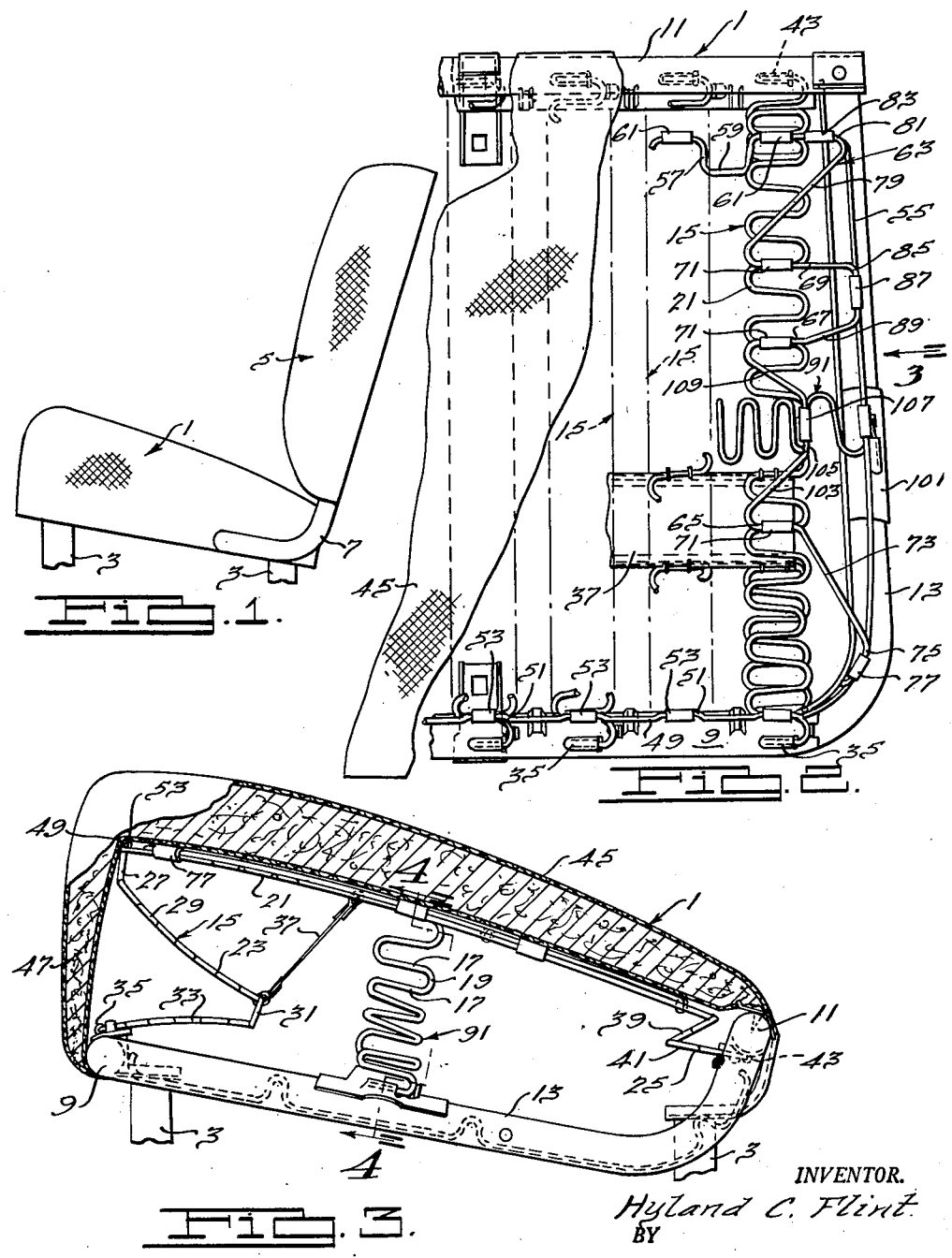
INVENTOR.
Hyland C. Flint
BY
Harness, Dickey & Pierce
ATTORNEYS.

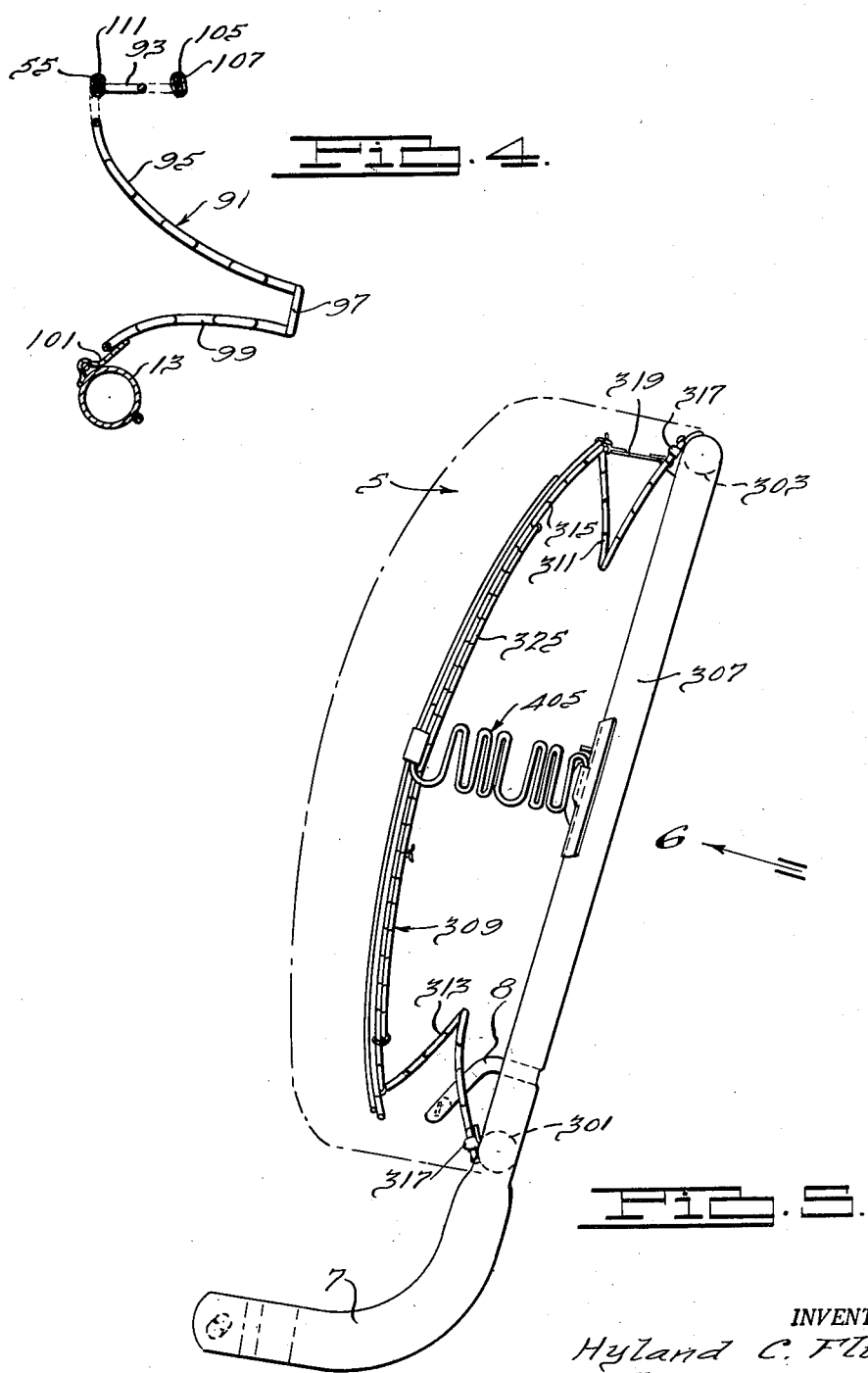

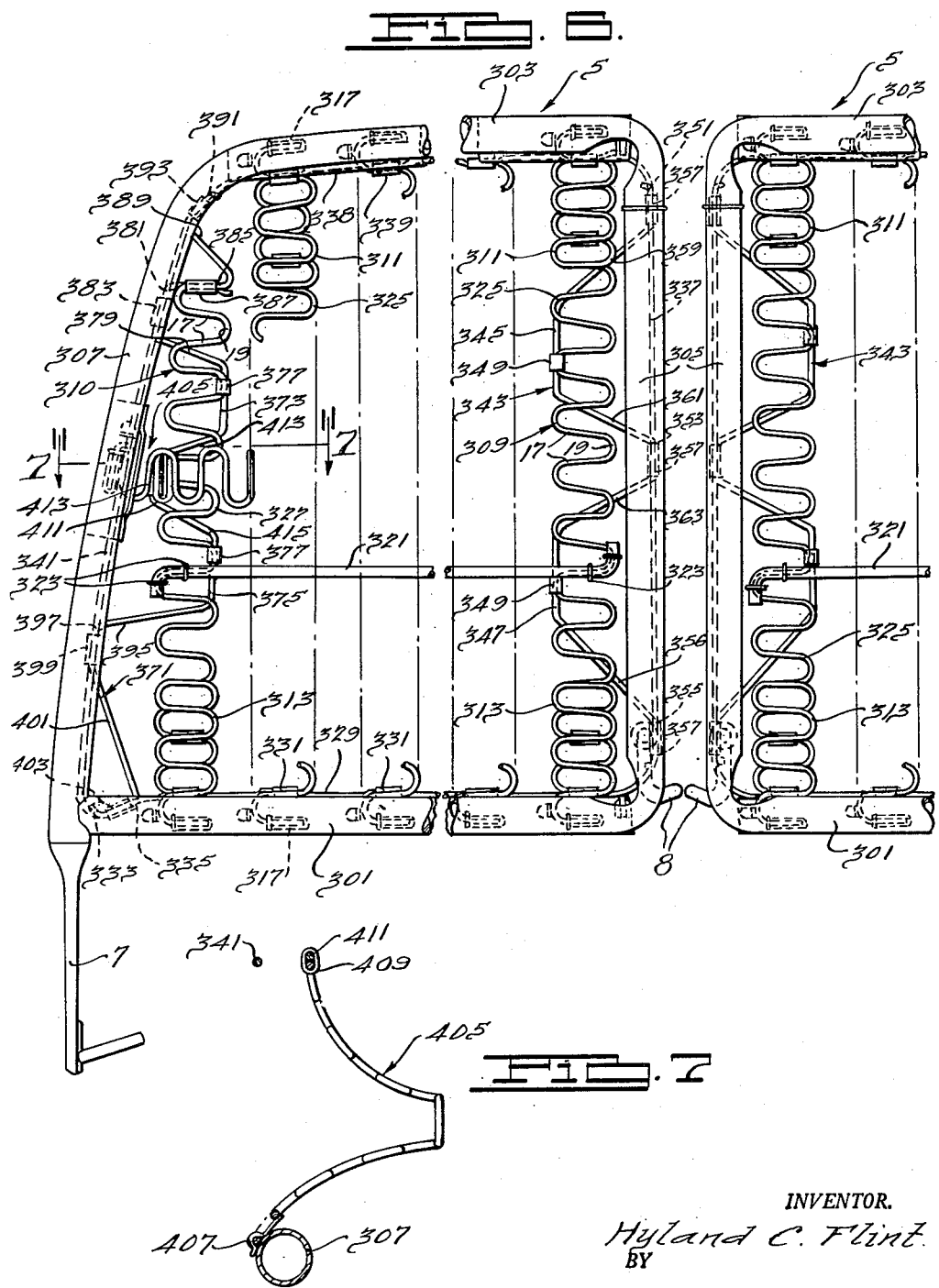

United States Patent Office 2,790,488
Patented Apr. 30, 1957

2,790,488
SPRING CONSTRUCTION

Hyland C. Flint, Birmingham, Mich., assignor to American Metal Products Company, Detroit, Mich., a corporation of Michigan Application November 21, 1950, Serial No. 196,903

5 Claims. (Cl. 155—179)

This invention relates to spring constructions, and, in particular, to those embodying sinuous springs of the type disclosed and claimed in Kaden Reissue Patent No. 21,263.

There has been a steady increase in the use of sinuous spring strips in various types of spring constructions and particularly in the spring constructions that are employed in seat structures for automobiles and other types of transport vehicles. Ordinarily, in the seat structures for these vehicles, the sinuous spring strips are placed parallel to each other and to the longitudinal axis of the vehicle. The seat load is most commonly applied to less than all of the spring strips and, in order to distribute the load throughout the entire spring construction, it is customary to connect the adjacent spring strips together in some manner so that load concentrated on certain of the strips may be spread to some extent to the adjacent spring strips. Passengers enter and leave the seats by movement transverse to the longitudinal axis of the vehicle and this movement is also transverse to the direction of the sinuous spring strips. Hence, rather severe loading conditions are imposed upon the marginal spring strips located at the extreme side edges of the seat or back cushion. The marginal spring strips are under the handicap of having no adjacent spring strip on one side to which a portion of the load can be transferred. It, therefore, creates a problem for the designer who wishes to maintain the desired cushion characteristics up to the extreme edge of the seat. On the one hand, the marginal spring may be bolstered up to such an extent as to make the edge of the seat hard and uncomfortable and, on the other hand, in seeking to avoid this, the result may be that the marginal spring will twist or be too soft to properly support a load and maintain the desired spring surface characteristics.

It is the object of this invention to provide means for supporting the marginal spring of an automobile seat structure, or other types of sinuous spring constructions, which imparts the desired strength and resistance to the marginal spring unit but at the same time enables it to yield and flex in conformity with the characteristics of the resilient cushion surface as a whole.

The invention comprehends the use of a brace member for the marginal spring which is connected to certain points on the marginal spring and also to a border wire which is preferably mounted on certain or all of the remaining sinuous springs in the cushion construction. The brace member and border wire may be assisted in their support of the marginal spring by a supplementary sinuous spring connected thereto and to the frame of the seat structure.

The invention is illustrated in the accompanying drawings in which:

Figure 1 is a side elevation of an automobile seat having a seat cushion and a back cushion embodying the invention;

Fig. 2 is a plan view of a portion of the seat shown in Fig. 1 with the upholstery removed to reveal the spring structure;

Fig. 3 is a side elevation as taken from position 3 of Fig. 2;

Fig. 4 is a section taken along the line 4—4 of Fig. 3 and reveals the transverse zigzag spring for supporting an intermediate portion of the marginal spring on the seat;

Fig. 5 is a side elevation of the back cushion shown in Fig. 1 with the padding shown in phantom lines and removed so that the spring structure is visible;

Fig. 6 is a view taken from the rear of the back cushion shown in Fig. 5 as seen from position 6 in Fig. 5, and Fig. 7 is a view similar to Fig. 4 taken on the line 7—7 of Fig. 6.

The automobile seat structure shown in Fig. 1 has a seat cushion 1 which is mounted on the floor of the automobile by means of suitable legs 3. The seat structure also has a pair of complementarily shaped back cushions 5 for the left and right sides of the seat, the structures of the two back cushions being the converse of each other as indicated in Fig. 6. The back cushions 5 and the seat cushion 1 are connected to each other in a suitable manner as indicated by side arms 7 and central brackets 8, the exact structure of these frame elements forming no part of the present invention.

Referring first to the structure of the seat 1 as revealed in Figs. 2-4, it has a frame of suitable construction which is illustrated as formed from tubular material and comprising generally parallel front and rear rails 9 and 11 which extend transversely to the longitudinal axis of the automobile in which the seat structure is used. Integral side rails 13 interconnect the front and rear rails and are curved upwardly adjacent the rear of the seat structure 1 so that the rear rail 11 is displaced upwardly from the front rail 9 as clearly shown in Fig. 3. The resilient spring surface is formed by a plurality of sinuous spring units 15 which extend longitudinally of the axis of an automobile in which the seating structure 1 may be used and are ordinarily spaced from each other and parallel to each other and extending perpendicularly to and between the front and rear rails 9 and 11. The sinuous spring wire used in forming the spring units 15 comprise suitable wire that is reversely bent alternately in opposite directions to provide spaced straight portions which are connected with one another by reverse bent or loop sections 19 which face alternately toward opposite sides of the spring strip. The sinuous spring wire employed is preferably pre-arched in accordance with the teachings of the Kaden Reissue Patent No. 21,263. The spring units 15 comprise a sinuous strip of spring wire of the type just described which has an intermediate web portion 21 that is supported by underbent front and rear portions 23 and 25 of the strip upon the front and rear rails 9 and 11. The webs 21 of the sinuous spring units 15 define in toto the resilient seating surface. The end portions 23 and 25 for supporting the front and rear edges of the webs 21 may be of any desired form but preferably are of the shape illustrated in Fig. 3, this construction being described and claimed in a copending application of the present inventor, Serial No. 170,901 filed June 28, 1950, entitled Spring Construction now Patent No. 2,719,578 granted Oct. 4, 1955. The front portion 23 has a short section 27 that extends downwardly from the front edge of the web 21 at substantially a right angle thereto. Integral with the section 27 is a rearwardly and downwardly extending portion 29 that is spaced by a short vertical section 31 above a downwardly and forwardly extending section 33. The front end of the section 33 is anchored by means of a suitable socket or clip 35 provided on the front rail 9. The vertical portion 31 of the front support 23 may be connected to an intermediate point on the web 21 by a listing strip 37 and preferably a common listing strip is employed for this purpose for all of the spring units 15. The rear support 25 for mounting the rear edge of the web 21 on the rear rail 11 comprises a downwardly and forwardly extending portion 39 and then a rearwardly extending portion 41 which is substantially parallel to the web 21. The rear end of the web 21 and thus the upper edge of the section 39 is spaced inwardly of the rail 11 and is located so that if extended it would lie beneath the top of the rail. The end of the section 41 is anchored to the rail 11 by means of a suitable socket or clip 43 provided on the bottom of the rail 11. This construction of the rear support for the web 21 enables the resilient spring surface to deflect inside of the rail 11 to eliminate hard spots at the rear of the seat but at the same time provide toe room beneath the rail 11.

The resilient surface provided by the combined webs 21 is covered with padding and upholstery 45 of a suitable type which is also brought down over the front of the seat structure as indicated at 47. The upholstery and padding is attached to the frame by suitable stitching or other means which form no part of this invention.

A border wire is provided to define the edges of the resilient surface. The border wire includes a front portion 49 having jogs 51 formed therein to which the front edges of the webs 21 are secured by means of clips 53. The border wire has side portions 55, only one of which is illustrated in Fig. 2, which preferably lie in the resilient surface defined by the spring units 15 and are spaced outwardly from the marginal or end spring unit 15. If desired, the border wire may be continued across the rear of the resilient surface, such a portion 57 being illustrated in Fig. 2 as integral with the side portion 55 of the border wire and having substantial jogs 59 formed therein intermediate the portions to which springs 15 are connected by way of clips 61.

The marginal spring unit 15 of a seat structure is subjected to somewhat different loading conditions than the central or intermediate spring units and further is deprived of support that in the case of other springs is furnished by spring units on opposite sides that are connected to it through the border wire or other cross connecting members. In accordance with the present invention, improved means for bracing and supporting the sidemost or marginal spring unit 15 are provided. This means includes a brace member 63 for joining the marginal spring unit to the border wire in a load transmitting connection. The brace 63 is preferably constructed of stiff wire or rod similar to that used for the border wire. The brace member 63, shown in Fig. 2, may be broadly described as reversely arched and is provided with three longitudinally spaced parallel sections 65, 67 and 69 that are connected by means of clips 71 to straight sections 17 on the wire of the web 21. The brace member 63 preferably lies on the top or load receiving side of the web and its first section 65, which is connected to the web, transmits load to approximately the junction between the border wire portions 49 and 55 by means of integral outwardly and forwardly extending portion 73 that is curved at 75, parallel to the border wire, and secured thereto by the clip 77. The section 69 at the rear of the brace member 63 which is connected to a straight portion of the web 21 transmits load to the border wire portion 55 by means of two direct connections leading from its point of attachment to the web 21. The rearmost of these is a portion 79 that extends integrally inwardly from the section 69 and then is reversely bent rearwardly and outwardly to approximately the juncture of the side portion of the border wire 55 with the rear border wire section 57 and then is bent at 81 parallel to the rear border wire section 57 to which it is secured by the clip 83. Load is also transmitted from the section 69 to the border wire section 55 by extension of the section 69 to the border wire and then bending of the brace member to form a section 85 that is parallel to the side border wire section 55 and secured thereto by the clip 87. The section 67 of the brace member 63 which is connected to a straight portion of the web 21 is connected also by means of the clip 87 to the border wire portion 55 by way of a brace member portion 89 which is integral with the brace member portion 85.

It is evident that the brace member 63 will cause the marginal spring unit 15 and the border wire to deflect together under load and at nearly the same rate. While the load on the border wire is yieldably resisted to some extent by all of the spring units, it may be desirable to furnish additional resilient support. This may be furnished by a sinuous spring element 91 located at the portion of the brace member 63 between its front web connecting portion 65 and its middle web connecting portion 67. As best revealed in Fig. 4, the sinuous spring support element 91 is preferably V-shaped and includes a top cantilever web section 93 which lies substantially in the resilient surface. Extending downwardly from the outer edge of the web 93 is an upwardly concave section 95 that also extends transversely inwardly beneath the marginal spring unit 15 but is spaced below it so that there is no danger of noisy contact. A short straight and substantially vertical section 97 spaces the end of the section 95 above the innermost end of an upwardly convex section 99 that is secured at its lower end to the side rail 13 by means of the clip structure 101.

The web connected portions 65 and 67 of the brace wire 63 each transmit a portion of their load to the sinuous support spring 91. This load is transmitted from the section 65 through a rearwardly and outwardly directed section 103 of the brace member 63 to a section 105 located at the outer edge of the web 21 that is parallel to a straight section of the spring support 91 which forms the inner end of the web 93 and is fastened thereto by clip 107. The section 105 also receives load from the web connected section through an outwardly and forwardly directed section 109 of the brace member 63. Preferably, and as illustrated, the border wire section 55 is also resiliently mounted on the side frame rail 13 by means of the support spring 91, this being conveniently accomplished by connecting it to the outer end of the web 93 through the medium of a clip 111.

It is evident that the change in load accompanying a person's movement on the seat 1 as he gets into or out of an automobile carrying the seat structure 1 can be readily handled by the marginal spring unit 15 as supported on the border wire 55 and the side support spring 91 through the medium of the novel brace member 63. The connection is such that twisting of the marginal spring does not take place and no radical changes in resiliency at the edge of the resilient surfaces are obtained to result in hard or soft spots.

The brace member construction of this invention is illustrated in Figs. 5–7 as applied to the back cushion sections 5. Each back cushion 5 has a frame which, as illustrated, is preferably formed of tubular material and comprises a lower rail 301, an upper rail 303, an inner side rail 305, and an upwardly extending and inwardly directed outer side rail 307, all of these rails being interconnected or integral with one another. A plurality of vertically extending sinuous spring units 309 are mounted on the top and bottom rails 303 and 301, an exception being made in the case of the outer marginal spring unit 310 which is not connected to the top rail 303 as will be hereinafter described. The sinuous spring units 309 have top and bottom outwardly facing V-shaped supporting sections 311 and 313 bent beneath the web 315 and secured by way of suitable sockets or clips 317 to the rails. A listing strip 319 may be connected between the lower leg of the top support 311 and the top edge of the web 315. Likewise, a transverse brace rod 321 may be connected to all of the spring units 309 and 310 by way of hog rings or clips 323. If desired, the webs 315 of the individual spring units 309 may be reinforced by means of helper springs 325. The outer marginal spring unit 310 may also comprise a web 327 that is supported on the bottom rail by means of a V-shaped support (not shown) similar to the support 313 and the top portion is supported on the frame in a manner to be discussed hereinafter.

The webs 315 and 327 define the resilient cushion surface of the back 5 and this is covered by conventional padding and upholstery (outlined in phantom lines). The resilient surface so formed is bounded by a border wire which has a section 329 extending along the bottom edge of the resilient surface and connected to the bottom edge of the web at inwardly jogged sections by means of clips 331. The border wire is formed from a single stiff piece of wire which preferably begins at the outer bottom edge of the wire as indicated by a junction 333. The portion of the wire between the junction and the bottom border wire section 329 is preferably downwardly inclined as indicated by the section 335. The border wire has a section 337 which lies substantially in the resilient surface and is spaced inwardly from the innermost marginal spring unit 309. The border wire also has a top section 338 adjacent to the top edges of the webs 315 which are secured thereto by means of clips 339. The top border wire section 338 is bent downwardly into an outer side border wire section 341 which terminates at the bottom of the cushion in the junction 333.

The inner marginal spring 309 is not subject to the rather severe loads imposed upon the cushion by people getting into and out of the seat structure. However, it is deprived of the support which could be furnished by a spring on the other side, and hence its operation is improved by use of a brace member 343 which serves to transmit part of its load to the side border wire section 337. The brace member 343 which also may be broadly described as reversely arched, has two longitudinally spaced vertically extending sections or arch crests 345 and 347 which are generally parallel to the webs 315 of the sinuous spring units 309. The sections 345 and 347 are connected by means of clips 349 to the loop sections 19 of the web 315 on the marginal spring which are remote from the border wire 337. The brace member 343 has three sections or crests 351, 353, and 355 that are vertically disposed and transversely spaced inwardly of the sections 345 and 347 and which are parallel to the border wire section 337 and secured thereto by means of clips 357. The load is transferred from the upper web connected section 345 by an upwardly and outwardly extending section 359 on the brace member which blends into the section 351. Load from web connected section 345 is also transmitted to the brace member section 353 by means of the downwardly and outwardly extending connecting portion 361. Likewise, the load from the web connected portion 347 is transmitted to the brace member section 353 by means of an upwardly and outwardly directed connecting portion 363. And the load from web connected section 347 is transmitted to the brace member section 355 by means of the downwardly and outwardly inclined brace member section 356. Preferably, the brace member 343 lies on top of the web 315 as indicated in Fig. 5 and in Fig. 6, the latter figure being a rear view of the back seat construction, so that seat load tends to press the spring unit 309 and the border wire down together.

The marginal spring unit 310 at the outer edge of the back cushion 5 is subjected to the more severe loads occasioned by people sliding into and out of the seat structure and, furthermore, presents an attachment problem in that the side frame member 307 is tapered or inclined inwardly in such a manner as to provide no convenient place for attachment of the top edge of the spring 310. The reversely arched brace member 371 serves to furnish a means for additional support to the marginal spring 310 and also as means to anchor the top edge of the web 327 of this spring unit.

The brace member 371 lies above the web 327 and has two longitudinally spaced vertical sections 373 and 375 that are located adjacent the inner loop or reverse bend sections 19 of the marginal spring 310 and are secured thereto by means of clips 377. Extending outwardly and upwardly from the upper web connected portion 373 is a section 379 of the brace member 371 which is bent at 381 parallel to the side 341 of the border wire and secured or clamped thereto by the clip 383. Beyond the section 381, the brace member is transversely bent to form a section 385 that is parallel to the straight portions 17 of the web 327 and which lies adjacent the resilient surface formed by the web 327 and the webs 315. The section 385 serves as a convenient support for the top of the web 327 which is secured thereto by the clip 387. The brace member 371 beyond the web supporting portion 385 is bent outwardly and upwardly in a section 389 which, at the end thereof, is bent in a section 391 that is parallel to the junction between the border wire sections 341 and 338 and secured thereto by the clip 393.

The brace member 371 below the lower web connected portion 375 is bent outwardly and downwardly in a section 395 that is bent itself parallel to the border wire 341 into a section 397 which is secured to the border wire 341 by a clip 399. The brace member 371 below section 397 is bent inwardly and downwardly in a section 401 which terminates in a section bent substantially normal to the section 401 and secured to the border wire section 335 by a clip 403.

In order to provide further resilient support for the marginal spring 310 and the border wire section 341 in addition to that which is supplied by way of the border wire's connection with the front and rear edges of the spring units 310, an additional side support sinuous spring 405 similar to the spring 91 previously described may be provided. This is preferably located intermediate the connections of the brace member with the web 327, that is between the sections 373 and 375 of the brace member 371. The spring 405 is similar in shape to the spring 91 and is mounted at its lower end on the side rail 307 by way of a suitable clip 407. Though the construction of Fig. 4 wherein the spring has a top web that is connected to both the border wire and the brace member is preferred, improved results are still obtained by use of the spring 405 which, as shown best in Fig. 7, is secured by means of a clip 409 to only a vertical section 411 of the brace member 371, this section being located between the border wire and the connections 377 of the brace wire with the web. The spring connected portion 411 of the brace member 371 is connected to the vertical web connected portions 373 and 375 by, respectively, an upwardly and inwardly directed section 413 and a downwardly and inwardly directed section 415 so that the spring connected portion 411 is located adjacent the outer edge of the spring 310 just as the connection of the spring 91 with the brace member 63 was located near the outer edge of the spring 15.

It is evident that the brace member 371 serves to bolster the web 327 of the marginal spring 310 by transmitting a part of its load to the border wire portion 341. The brace member 371 also furnishes a convenient anchor point 385 for the top of the marginal spring. Inasmuch as the spring unit 310 is subjected to more severe useage than the marginal spring 309 at the center of the seat, the additional sinuous spring supporting element 405 may be used to provide a desired resiliency and other characteristics at this edge of the back cushion 5.

The disclosure herein will suggest other modifications to those in the art within the spirit and scope of the present invention; hence, it is not intended to limit the invention to the specific structure described.

What is claimed is:

1. In a spring cushion construction, the combination of a frame having longitudinally spaced transverse rails, a plurality of longitudinally extending transversely spaced sinuous springs secured at opposite ends to said rails, said springs comprising substantially straight longitudinally spaced sections joined alternately at opposite ends by reverse bend sections and having load receiving webs defining a resilient surface, a border wire around said resilient surface having portions secured to the opposite ends of said webs, said border wire having a portion spaced transversely outwardly from a marginal sinuous spring, and a brace wire fixedly secured to a plurality of straight sections on the web of said marginal sinuous spring so as to constitute a rigid extension of said straight sections, said brace wire also being secured to a plurality of points on the border wire portion that is spaced tranversely outwardly from the marginal spring to thereby transmit load from said marginal spring to said border wire.

2. In a spring cushion construction, the combination of a frame having longitudinally spaced transverse rails, a plurality of longitudinally extending transversely spaced sinuous springs secured at opposite ends to said rails, said springs comprising substantially straight longitudinally spaced sections joined alternately at opposite ends by reverse bend sections and having load receiving webs defining a resilient surface, a border wire around said resilient surface having portions secured to the opposite ends of said webs, said border wire having a portion spaced transversely outwardly from a marginal sinuous spring, and a brace wire on the load receiving side of said surface secured to a plurality of reverse bend sections on the inner edge of the marginal sinuous spring remote from the border wire, said brace wire also being secured to a plurality of points on the border wire portion that is spaced transversely outwardly from the marginal spring to thereby transmit load from said marginal spring to said border wire.

3. In a sinuous spring cushion construction having a side border wire, the combination of a marginal sinuous spring at the side edge of the cushion but spaced inwardly from said border wire and substantially in the plane of the border wire, a reversely arched brace wire located so that the plane thereof is on the load receiving side of the spring and in juxtaposition thereto, clips securing top portions of certain of said brace wire arches to portions of the spring that are located inwardly of the outer side edge of the spring, said brace wire when so secured being a rigid lateral extension of the load receiving side of the spring, and clips securing portions of other and reversed brace wire arches to said border wire.

4. In a sinuous spring cushion construction having a side border wire, the combination of a marginal sinuous spring comprising longitudinally spaced straight sections joined at alternate ends by oppositely facing reverse bend sections, said spring providing a load receiving web spaced inwardly of the side border wire and substantially in the plane of the border wire, a brace wire in juxtaposition to the load receiving side of the web, said wire being bent back and forth between said border wire and the inner edge of the web and having straight portions in engagement with straight portions of the web and other portions in engagement with portions of the side border wire, and means clamping said brace wire portions to the web and border wire so that said wires form a rigid lateral extension of said web.

5. In a sinuous spring cushion construction having a side border wire, the combination of a marginal sinuous spring comprising longitudinally spaced straight sections joined at alternate ends by oppositely facing reverse bend sections, said spring providing a load receiving web spaced inwardly of the side border wire and substantially in the plane of the border wire, a brace wire in juxtaposition to the load receiving side of the web, said wire being bent back and forth between said border wire and the inner edge of the web and having portions in engagement with reverse bend portions on the inner edge of the web and other portions in engagement with portions of the side border wire, and means clamping said brace wire portions to the web and border wire.

References Cited in the file of this patent

UNITED STATES PATENTS

| | | |
|---|---|---|
| 2,285,827 | Neely | June 9, 1942 |
| 2,305,530 | Hopkes | Dec. 15, 1942 |
| 2,392,254 | Mayer | Jan. 1, 1946 |
| 2,526,184 | Williams et al. | Oct. 17, 1950 |
| 2,568,829 | Scott et al. | Sept. 25, 1951 |